United States Patent [19]
Renfroe et al.

[11] Patent Number: 5,931,244
[45] Date of Patent: Aug. 3, 1999

[54] CABLE STEERING SYSTEM

[75] Inventors: David A. Renfroe; Joseph F. Partain, both of Fayetteville, Ark.

[73] Assignee: Board of Trustee of University of Arkansas, Little Rock, Ark.

[21] Appl. No.: 08/728,540

[22] Filed: Oct. 9, 1996

[51] Int. Cl.⁶ .............................................. B60K 17/30
[52] U.S. Cl. ..................... 180/6.32; 180/6.4; 280/267; 280/778; 280/93.51; 74/96; 74/98
[58] Field of Search ................... 180/6.32, 6.4, 180/402, 408, 409, 411, 425, 315; 280/267, 774, 778, 98, 103, 771, 93.502, 93.51; 74/96, 98, 484, 486, 489, 492

[56] References Cited

U.S. PATENT DOCUMENTS

| | | | |
|---|---|---|---|
| 935,610 | 9/1909 | Mauksch | 180/6.32 |
| 1,610,580 | 12/1926 | Nicholson | 280/773 |
| 1,621,916 | 3/1927 | Williams et al. | 280/773 |
| 2,111,668 | 3/1938 | Latzen | 280/773 |
| 2,171,157 | 8/1939 | Mathews | 280/660 |
| 2,229,394 | 1/1941 | Stinne | 280/773 |
| 2,757,014 | 7/1956 | Schmitz | 280/773 |
| 2,834,605 | 5/1958 | McCollough | 180/411 |
| 2,956,814 | 10/1960 | Jackson | 280/93.51 |
| 3,063,731 | 11/1962 | Liverance | 280/773 |
| 3,479,050 | 11/1969 | Bloise | 280/93.51 |
| 3,482,398 | 12/1969 | Christensen | 60/52 |
| 3,669,466 | 6/1972 | Spence | 180/409 |
| 3,933,215 | 1/1976 | Scheuerle | 180/411 X |
| 4,006,664 | 2/1977 | Brown | 91/171 |
| 4,257,619 | 3/1981 | Fisher | 180/411 |
| 4,263,979 | 4/1981 | Sturgill | 180/411 |
| 4,289,214 | 9/1981 | Spence | 180/409 |
| 4,823,899 | 4/1989 | Ron | 180/411 |
| 4,986,387 | 1/1991 | Thompson et al. | 180/212 |
| 5,014,802 | 5/1991 | Knoll et al. | 180/408 |
| 5,090,512 | 2/1992 | Mullet et al. | 180/236 |
| 5,094,312 | 3/1992 | Hakel | 180/132 |
| 5,201,380 | 4/1993 | Callahan | 180/403 |
| 5,435,407 | 7/1995 | Renfroe | 180/79 |
| 5,653,304 | 8/1997 | Renfroe | 180/402 |
| 5,676,388 | 10/1997 | Bertani | 280/267 |

*Primary Examiner*—Daniel G. DePumpo
*Attorney, Agent, or Firm*—Robert R. Keegan; Head, Johnson & Kachigian

[57] ABSTRACT

A steering system in an all-terrain four-wheeled vehicle with independent suspension wherein necessary forces for steering control are supplied by cable and pulley actuators with the cable running parallel to the suspension arm between vehicle frame and wheel, steering control by the driver being by manipulation of right and/or left steering levers eliminating the need of steering wheel and steering column in front of the driver. The steering actuators are independent and there is no linkage for coordinating their turning angles; rather, close coordination of the wheel turning angles for achieving the turning angle relation between the wheels is by a non-linear linkage whereby the actuators are provided with separate displacement motions with the non-linear relation to achieve the desired relation between the steering angles of the wheels.

10 Claims, 4 Drawing Sheets

CABLE STEERING SYSTEM

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

The present invention relates to steering systems for wheeled vehicles, particularly such vehicles with at least two steerable wheels under manual control of a driver and in which the steerable wheels are independently suspended from the vehicle body frame. More generally, the invention is applicable to steering systems for wheeled vehicles with at least two steerable wheels. By the present invention, the necessary forces for causing each of the steerable wheels to properly respond to the steering control provided by the driver is effectuated between the vehicle body and each (usually independently suspended) steerable wheel control arm by a mechanical actuator preferably in the form of control cables. The coordination of the left wheel and right wheel motion is attained, not with the usual mechanical link between steering control arms for the wheels, but rather by two distinct motion-position control signals provided to each of the actuators. These two signals and, hence, the motions imparted by the respective actuators have a predetermined non-linear relation which can be produced by non-linear coupling mechanism or by an electronic digital or analog computer. An advantage of the system of the invention is that the necessity for a conventional steering column is eliminated along with the safety hazard that such columns present for the driver in the event of a mishap. Another advantage is that it facilitates a very large angle of vertical travel for the independent suspension arms which is desirable for some vehicles and virtually impossible to obtain in conventional steering systems. It is particularly suitable for fore and aft extending suspension systems.

The present invention is in sharp contrast to the traditional wheeled vehicle steering system. The structure, adjustment, and alignment of the steering mechanism of a wheeled vehicle is a somewhat complicated matter involving various relationships of each steerable wheel axle to the vehicle body referred to as caster, camber, toe-in, Ackerman angle and the like. No attempt is made here to present a detailed discussion of all these factors, except as they relate to the improvements of the present invention.

For over a century, the steering system for automotive vehicles has utilized a front axle which does not rotate about a vertical axis when the vehicle is steered to the right or the left. Rather, each front wheel is provided with a stub axle which is rotatable about a vertically disposed king-pin or equivalent pivotal mounting structure. Accordingly, it is necessary to provide means by which the front wheels turn to the left or turn to the right together in a coordinated fashion. It was long ago determined that optimum steering was not achieved with strictly parallel motion of the front wheels because the outwardly turning wheel is closer to the vehicle turning center than the inwardly turning wheel and needs to rotate through a greater angle. This refinement and provision for steering control is referred to as the Ackerman angle provision.

A common and conventional wheeled vehicle steering system provides for the rotation of the steering column or steering shaft to be converted into linear motion of a link which imparts a rotating motion to the stub axle of the wheel through a steering control arm extending from the stub axle. The common means for providing coordinated motion of the two steerable wheels includes a track arm which also is fixed with respect to the stub axle on each wheel together with a track rod extending between the two track arms so that the two front wheels are constrained to move (track) in a predetermined relationship either to the right or to the left. In most cases the linkage provided does not maintain the wheels parallel but rather provides a nonlinear turning relationship which takes into account the Ackerman angle provision.

Hydraulic systems have been incorporated in conjunction with wheeled vehicle steering systems and perhaps the most common form of such hydraulic system is a power assist for the steering shaft which still requires the above-discussed track rod and track arm arrangement for coordinating turning motion of the steerable wheels. As mentioned above, the present invention eliminates reliance upon a track rod or other direct mechanical linkage between the left and right steerable wheels by causing the turning motion of each wheel to be effected by its own independent mechanical actuator.

Steering systems for wheeled vehicles have been proposed in prior patents which employ fluid-mechanical actuators in the form of hydraulic cylinders, but known steering systems employing hydraulic cylinders have commonly provided positive coordination with track rods or other direct mechanical connection between the left side and the right side wheel.

The steering system of the present invention provides adaptability to lever steering which eliminates the necessity of a steering wheel. The control of the vehicle may be accomplished with either hand or both hands. The double handle configuration of the preferred embodiment gives the operator a sense of driving a motorcycle using the handle bars except the center section of the handle bars is not present. This also allows entry and exit to the vehicle through the front of the vehicle if desired, and it removes the danger of the steering wheel and the necessary support structure upon which a person may be injured and impaled in the event of accidents. This then allows increased ride-down distance which can be incorporated into the vehicle restraint system to reduce injuries.

The Ackerman steering in the preferred embodiment is accomplished by a system of bellcranks below the seat or elsewhere in the cockpit and not with the angular relationships of a steering arm, track rod, and steering knuckle. The customary lever linkage to convert linear motion to rotational motion of the wheel about the vertical king pin axis is preferably replaced by the action of a cable winding on and unwinding from a drum pulley coaxial with the normal king pin axis. The steering actuator is effectively a rotary actuator which mounts on the steering axis of each wheel. The designer is free to set parameters of these elements to optimize suspension travel and to prevent bump steer.

Although independent control of steering of the two front wheels is mentioned in prior systems, they are not generally independent in the sense of no direct coupling between the two wheels.

U.S. Pat. No. 5,094,312 to Hakel dated Mar. 10, 1992 (U.S. Cl. 180/132) shows a vehicle steering system in which the left and right steering control arms for the front wheels are both operated by a single double-acting hydraulic piston with oppositely directed piston rods each coupled by a mechanical link to a respective steering control arm. This single piston arrangement is in effect a direct mechanical linkage from the left side wheel to the right side wheel and there are not two independent hydraulic cylinders for the respective left and right steerable wheels. U.S. Pat. No. 4,986,387 to Thompson et al., dated Jan. 2, 1991 (U.S. Cl. 180/212) shows a steerable wheeled vehicle with a steerable wheel for which turning motion is provided by hydraulic cylinder and a rack and pinion, but, since there is only one steerable wheel, it provides no teaching with respect to coordination of two steerable wheels relevant to the present invention.

U.S. Pat. No. 5,090,512 to Mullet et al., dated Feb. 25, 1992 (U.S. Cl. 180/236), like the patent to Hakel, relies on a direct mechanical connection from the left side to the right side of the steering system including a rotatable shaft and cam pulleys operating a cable arrangement for wheel steering. U.S. Pat. No. 4,006,664 to Brown has hydraulic operated steering, but like the patent to Hakel has only a single cylinder for left and right wheels, the coordinated motion of which must be provided by a linkage directly connecting left and right wheels with the single cylinder provided for their operation.

U.S. Pat. No. 2,757,014 to Schmitz, dated Jul. 31, 1956 (U.S. Cl. 280/87) discloses a steering system for a tractor having pairs of control cylinders and operating cylinders for providing steering motion to the respective front wheels which is independently controlled, there being no tie-rod connecting to the two front wheels. Although the independent control of the two front wheels is arranged so that there is a non-linear relationship between the steering motion of the left wheel and the right wheel, this non-linear relationship is not for the purpose of providing a desired Ackerman angle relationship in the steering mechanism, but, rather, is to facilitate very sharp turning of the tractor vehicle about either the left rear wheel or the right rear wheel. Accordingly, the stated objective of the steering system is solely to arrive at an extreme or limit position for the wheels in which the left wheel is turned by ninety degrees and the right wheel is turned by about fifty degrees (or vice versa). No Ackerman angle is sought or achieved for modest steering motions and, as the description states, any normal steering movement of the wheel 24 will be transmitted to the wheels 13 and 14 equally. Other features of the Schmitz disclosure make it unsuitable for an all-terrain vehicle; note that the front wheels of the vehicle are not independently suspended and there is no suggestion that it could be modified for inclusion in a vehicle with independent suspension for the steerable wheels.

BRIEF SUMMARY OF THE INVENTION

In addition to providing the features and advantages described above, it is an object of the present invention to provide a wheeled vehicle steering system which achieves coordination between the steering motion of the left and right wheels by providing independently controlled actuators, the motions of which are coordinated through the mechanical control systems thereof, thereby avoiding the necessity of direct mechanical linkage extending between the right side and left side wheels of the vehicle.

It is another object of the present invention to provide a left side cable drum and pulley and right side cable drum and pulley for a steerable wheeled vehicle wherein one cable drum is positioned at a steerable wheel at each side and for each side a pulley is positioned in proximity to a driver position and coupled to at least one steering lever, thereby eliminating the necessity for a conventional elongated steering column extending from the driver position to the lower front portion of the vehicle and for a tracking rod between the front wheels.

It is yet another object of the present invention to provide a steering system for a wheeled vehicle wherein steering motion of each of the steerable wheels is provided by a mechanical actuator positioned near or at such wheel together with means remote from the steerable wheels for coordinating the motion of the actuators to have a predetermined non-linear relation and obviating the necessity for a direct mechanical linkage between the left steerable wheel and the right steerable wheel.

It is still another object of the present invention to provide a steering system for a wheeled vehicle with at least two independently suspended steerable wheels in which the steerable wheels are each provided with a light weight mechanical rotary actuator for producing steering motion for the wheel, and each such actuator is mounted with respect to the independent suspension for the wheel to allow large-angle vertical motion of the wheel suspension with turning control and power provided to the wheel through cable connections from the vehicle body to the suspension-mounted actuators.

BRIEF DESCRIPTION OF THE SEVERAL VIEWS OF THE DRAWINGS

In addition to the objects and advantages described above, other objects and advantages of the invention will be apparent from consideration of the following description in conjunction with the drawings in which.

DETAILED DESCRIPTION OF THE INVENTION

Figure 1:
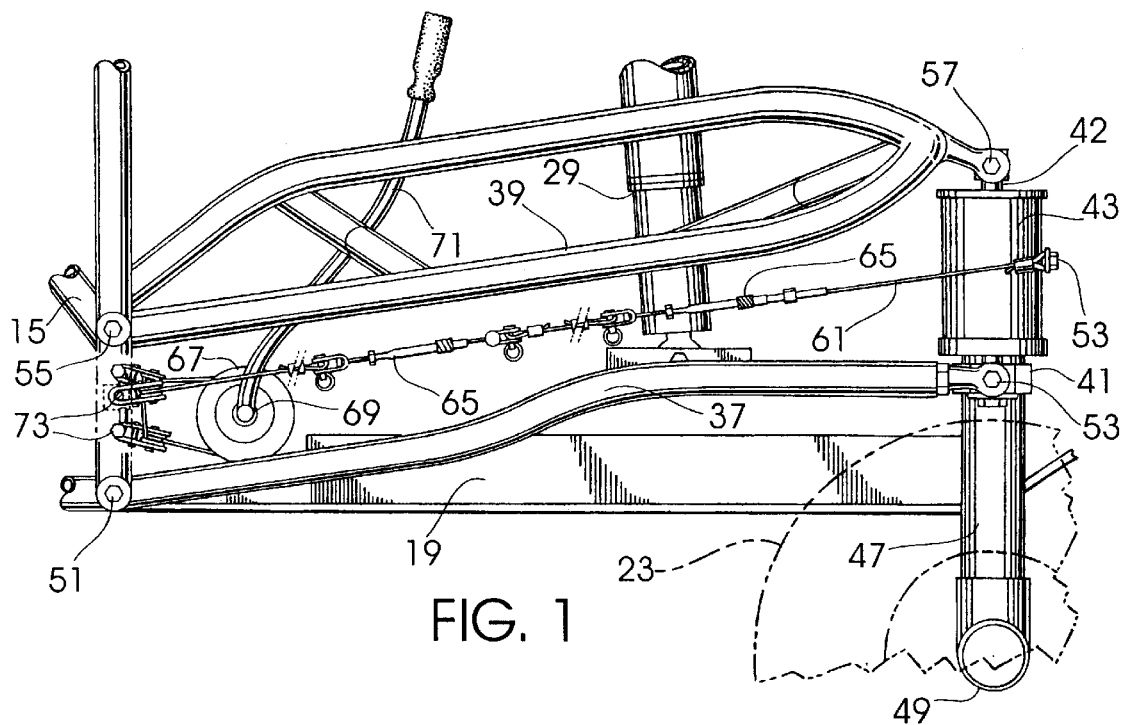
FIG. 1 is a fragmentary side elevational view of a steering lever operated cable steering system for a wheeled vehicle according to the invention.
Figure 3:
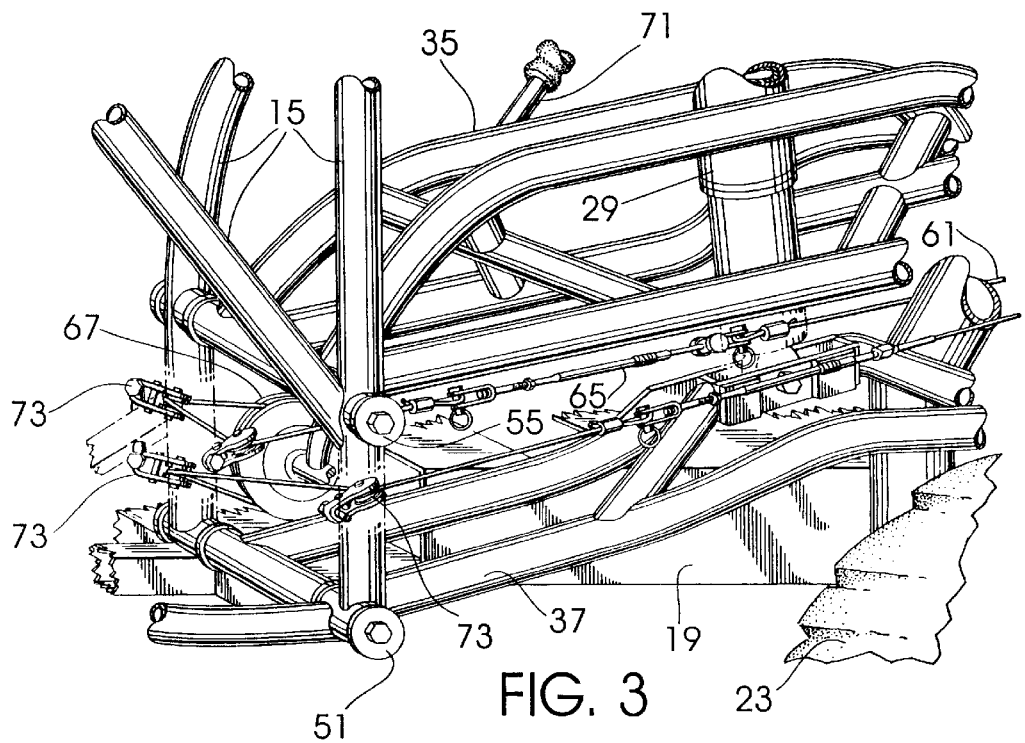
FIG. 3 is a fragmentary perspective view of a portion of the cable steering system of FIG. 1 and FIG. 2.
Figure 4:
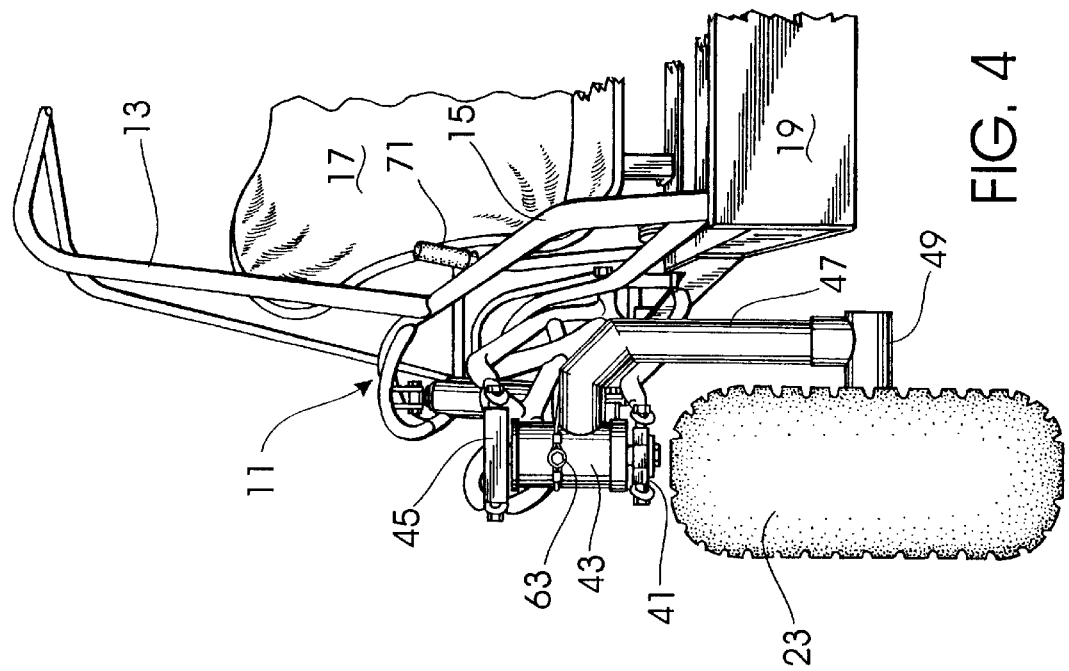
FIG. 4 is a fragmentary front elevational view of a vehicle incorporating the cable steering system of FIG. 1.
Figure 2:
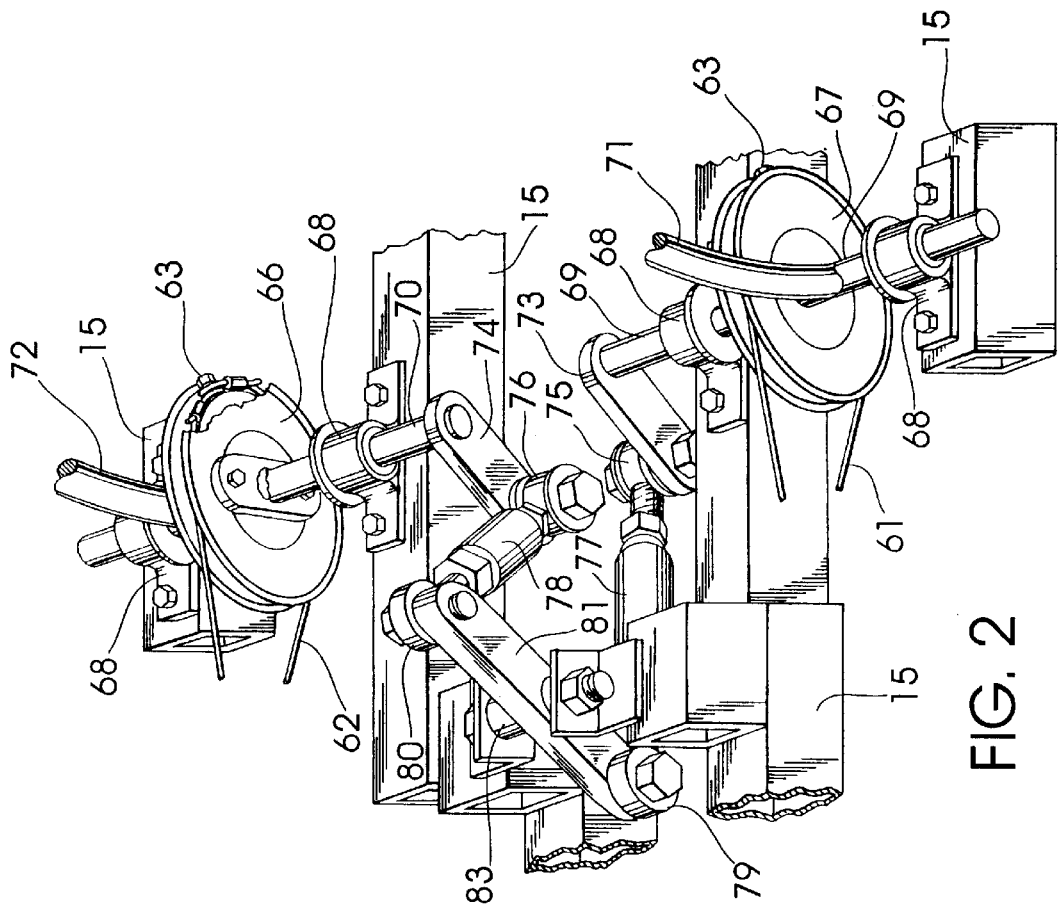
FIG. 2 is a fragmentary perspective view of a portion of the cable steering system of FIG. 1.
Figure 5:
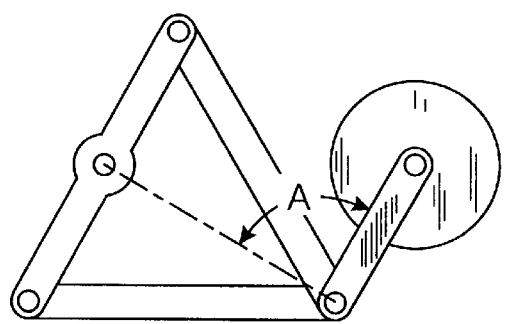
FIG. 5 is a schematic diagram of a bell crank linkage suitable for incorporation in the cable steering system of FIG. 1.
Figure 6:
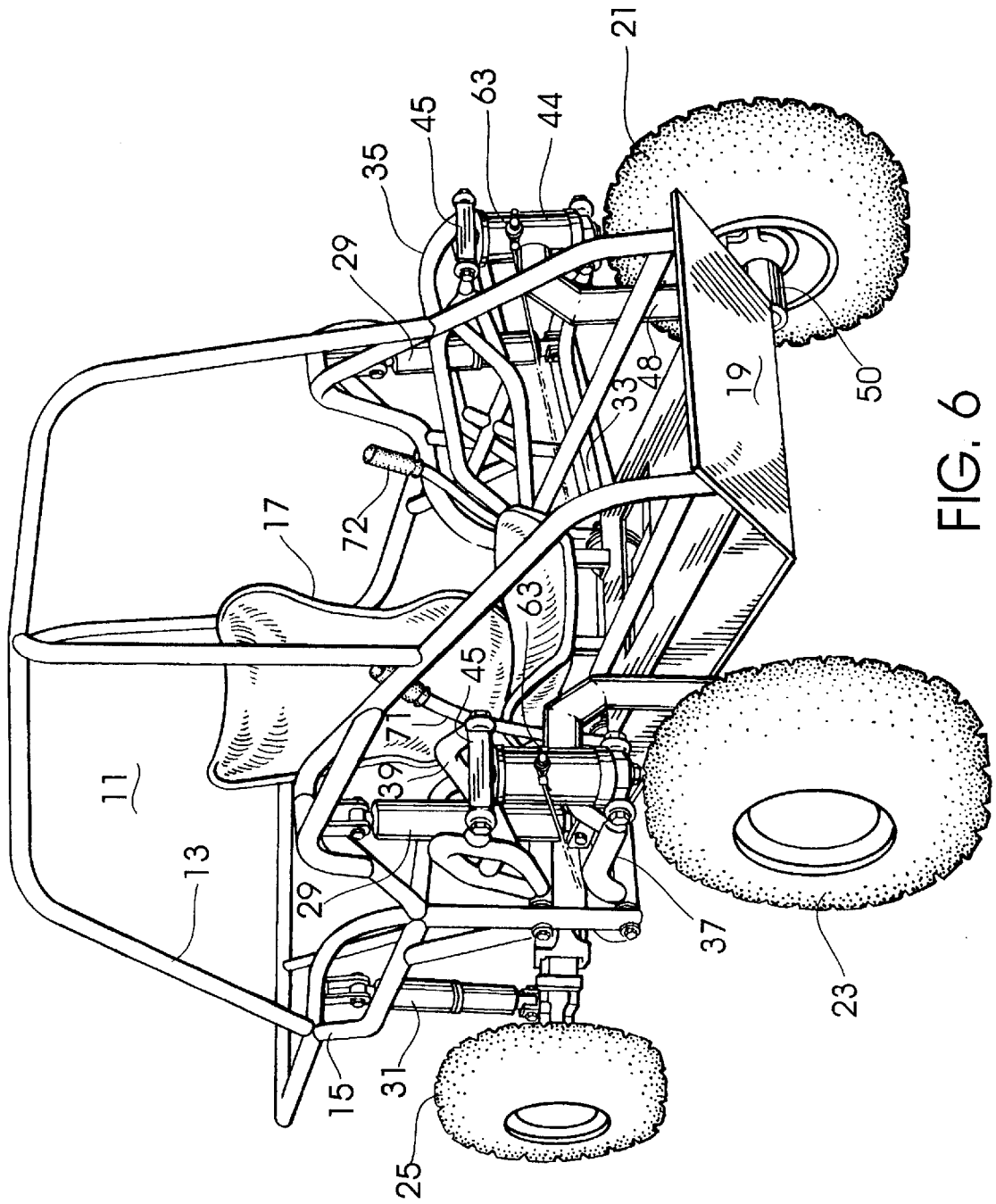
FIG. 6 is a perspective simplified view of an all terrain vehicle incorporating a cable steering system according to the invention.

Referring now to the drawings, and particularly FIGS. 1 through 6, whereas the cable-steered vehicle as a whole is shown in FIG. 6, the improved cable steering according to the invention is more clearly shown in FIGS. 1, 2, and 3. As shown in FIG. 6 the vehicle 11 has a roll cage 13, a frame 15, driver's seat 17, floor plate 19, and wheels 21, 23, 25, and 27, all of which are generally conventional.

The cable steering system itself should be considered in conjunction with the independent front wheel suspension with which it is intimately associated and which also has novel features. In FIGS. 1 and 3 the right front wheel 23 is shown together with the independent suspension and steering associated therewith. Shock absorbers 29 are provided for the front wheels and shock absorbers 31 are provided for the rear wheels; vehicle springs may be integrated with the shock absorbers 29 and 31 or may be appropriately mounted apart from the shock absorbers 29 and 31. The suspension for the rear wheels 25 and 27 is not material to the invention and is not shown in detail. Also the engine system, lights, brake system, controls and instruments may be of conventional form and are not shown or described in detail.

The right front wheel 23 is independently suspended from the vehicle frame 15 with two parallel mounted suspension arms 37 and 39 and left wheel 21 is similarly provided with suspension arms 33 and 35.

Details of the suspension and the cable steering system are shown with respect to the right front wheel 23 and it will be understood that the structure associated with the left front wheel 21 is essentially a mirror image thereof. It should be noted that the common way to arrange an independent suspension is with outrigger suspension arms with pivotal mountings having an axis generally parallel to the longitudinal axis of the vehicle, i.e. the direction of travel. As shown in FIGS. 1, 2, 3, and 6 the front wheel suspension comprising suspension arms 37 and 39 might be termed a fore and aft suspension system wherein the suspension arms 37 and 39 extend from a central portion of the vehicle to the forward portion of the vehicle and are themselves generally parallel to the direction of motion. The pivot axis for extension arms 37 and 39 therefore extends in a direction transverse to the vehicle direction of motion, and in the preferred embodiment illustrated is at 90° to the direction of motion.

The mounting for wheel 23 is also unconventional in that it comprises a strut 47 which is approximately vertical having at its lower end a stub axle 49. In a corresponding manner left front wheel 21 has a strut 48 and a stub axle 50. As will later be explained in detail, strut 47 is secured to steering drum 43 while strut 48 is secured to steering drum 44. Steering drum 43 and strut 47 rotate together for steering the vehicle as do steering drum 44 and strut 48.

A parallel suspension structure is provided by suspension arms 37 and 39 forming the long, predominantly horizontal portions of a parallelogram with frame 15 and steering drum 43 acting as the shorter vertical sides of the parallelogram. Pivot element 51 pivotally connects arm 37 to frame 15; pivot element 53 pivotally connects steering drum base 41 with lower suspension arm 37. Steering drum 43 is rotatably mounted on shaft 42 which is connected between steering drum base 41 and steering drum upper support 45.

Pivot element 55 pivotally connects upper suspension arm 39 to frame 15 and pivot element 57 connects upper suspension arm 39 to steering drum support 45 and thus to shaft 42. The well known parallelogram linkage technique causes shaft 42, steering drum 43, and strut 47 to be maintained parallel with the vertical portion of frame 15 between pivot element 51 and pivot element 55 as wheel 23 rolls on uneven terrain causing pivotal movement of suspension arms 37 and 39.

An important advantage of the fore and aft suspension system illustrated in FIGS. 1, 3, 4, and 6 is that relatively long suspension arms can be employed which makes it possible to have far greater free up and down movement of wheels 21 and 23, improving the ability of the vehicle 11 to negotiate very rugged terrain without greatly reducing speed. The steering drums 43 and 44 and cables 61 and 62 add very little weight to the independent suspensions for wheels 21 and 23 and thus the unsprung weight of the vehicle is not materially increased by the novel steering system.

It may also be noted in FIG. 1, for example, that the preferred neutral position of suspension arms 37 and 39 is with their forward pivot elements 53 and 57 somewhat higher than pivot elements 51 and 55 whereby reaction force on encountering an obstacle in the path of wheel 23 has an upward component tending to raise wheel 23 thereby enhancing the tendency of the wheel itself to roll over obstacles. It will be further noted that the range of displacement of the suspended wheel in apparatus according to the invention is much greater than in the case of the more common outrigger suspension arrangement. In the apparatus illustrated the displacement accepted by the suspension arms could be substantially greater than the radius of the wheel (with a suitable size of shock absorber suitably positioned). The travel in the illustrated embodiment is limited by the shock absorber to somewhat less than the maximum obtainable.

It is important to observe that such wide vertical travel of the wheels and the suspension systems would be essentially impossible with ordinary steering systems employing a tracking rod or other mechanical linkage interconnecting the steering units of the two front wheels. The cable steering system according to the present invention, however, is particularly adapted for use with a large deflection independent suspension system.

The positioning of wheel 23 for steering is controlled by cable 61 in the form of a loop, one end of which wraps on steering drum 43 and is secured against slipping by an anchor bolt 63. Cable 61 is provided with adjustable links 65 to maintain proper tension in the cable and for making slight adjustments in positioning of wheel 23. Conventional connectors are provided for facilitating assembly of the cable in position. Such adjustments allow setting of toe-in, if desired, without major structural adjustment. Structural provisions for parameters such as camber and caster may be included, but are omitted here for simplicity and clarity.

Steering drum 43 acts as a pulley in that it translates the linear movement of cable 61 into rotation of steering drum 43, strut 47, and wheel 23. Means for receiving steering motion displacement is thus provided. Rather than being a tall cylinder as shown, steering drum 43 could take the form of a cylindrical disk or an ordinary flat or grooved pulley. The driving element for cable 61 and in drum 43 is pulley 67 which is rotatably mounted with respect to frame 15 on a shaft 69 mounted in bearings 68. Pulley 67 provides means for transmitting steering motion displacement. An anchor bolt 63 prevents slippage between cable 61 and pulley 67. Pulley herein is used in the broad sense of a wheel of any size with a flat, curved, or grooved rim, revolvable on its axis, supported by a bearing and normally used to transmit power by means of a band, belt, cord, cable, or chain.

Cable 61 is guided from steering drum 43 acting as a pulley to pulley 67 by pulleys 73, all of which are mounted to a portion of frame 15. It is important that the pulleys are situated so that the cable runs of cable 61 from steering drum 43 to the first of the pulleys 73 is parallel to the sides of the parallelogram formed by suspension arms 37 and 39 and that the cable runs remain parallel throughout the range of motion of arms 37 and 39. When the cable 61 is secured by anchor bolt 63 on drum 43 midway between arms 37 and 39, as shown, the end of the cable runs from steering drum 43 should be effectively terminated midway between pivot elements 51 and 55 so that the cable run of cable 61 also forms a parallelogram with each of the parallelogram sides represented by arms 37 and 39. The other cable runs between pulleys 73 and the cable run to pulley 67 need not meet such requirements because those elements are all fixed relative to frame 15. From the discussion above it will be seen that rotation of pulley 67 will result in translation of cable 61 to cause rotation of steering drum 43 and steering angle displacement of wheel 23. The extent of rotation will depend upon the relative diameters of pulley 67 and steering drum 43 which, in the illustrated embodiment, is approximately one to one. Rotation of pulley 67 is produced by motion of steering lever 71 by the vehicle driver. In the apparatus thus far described steering motion of wheel 23 is produced by a driver positioned in seat 17 by forward or reverse movement of steering lever 71 located at the driver's right side, such motion being totally independent of the motion of the front left wheel 21.

The front left wheel 21 is provided with essentially the same steering apparatus generally arranged as a mirror image of the apparatus for front right wheel 23. Thus, wheel 21 is rotatably mounted on a stub axle 50 affixed to the bottom of strut 48 which is secured to steering drum 44 for rotation therewith. Cable 62 wraps on steering drum 44 and is secured by anchor bolt 63. Cable 62 is guided by pulley 73 (not shown) to a pulley 66 fixedly mounted on shaft 70 which is rotatably mounted in bearings 68 on frame 15. Steering lever 72 is secured at the bottom with respect to shaft 70 and pulley 62 so that forward and backward motion of steering lever 72 is transmitted through cable 62 to produce steering motion of front left wheel 21. The pulleys described have all been circular cross-section pulleys producing a linear relation between linear cable displacement and angular pulley motion non-circular or eccentric pulleys could be used to provide a non-linear relation if desired.

Considering only the apparatus thus far described the movement of wheel 21 in response to steering lever 72 is totally independent of steering lever 71 and wheel 23. The necessary coupling between wheel 21 and wheel 23 to provide coordinated movement thereof in steering action is provided by a steering motion controller in the form of a mechanical linkage between shaft 69 and shaft 70 as best seen in FIG. 2. It should be noted that the illustration in FIG. 2 is presented to show the structure of the mechanical linkage and not to show the appropriate angular relationships for coordinated steering according to the Ackerman angle relation or otherwise. Shaft 69 has secured thereto a crank 73 while shaft 70 has secured thereto a similar crank 74. The outer ends of cranks 73 and 74 are provided with connector pins 75 and 76 for links 77 and 78 for coupling crank 73 and link 77 to permit relative rotation and to provide similar coupling for crank 74 and link 78.

A straight crank 81 rotatably mounted on shaft 83 is connected at one end to link 77 by connector pin 79 and at the other end is connected to link 78 by connector pin 80.

The coupling of shaft 69 and shaft 70 to provide relatively non-linear angular motion is best shown in FIG. 5. There it will be seen that clockwise motion of shaft 70 will produce counterclockwise motion of shaft 69 and vice-versa. As shown in FIG. 2, lever 71 is coupled to shaft 69 while lever 72 is coupled to shaft 70 providing means for coupling the steering levers to cause their motions to be in opposite directions. There is one position where the linkage elements are disposed symmetrically about a plane passing through shafts 69 and 70 and through shaft 83 where the motions of cranks 73 and 74 are instantaneously equal and opposite with the result that the rotations of shafts 69 and 70 are also equal and opposite. This represents the straight ahead steering position of wheels 21 and 23, and the adjustment of the various elements of the cable steering system is made accordingly. It should be pointed out that the straight ahead steering position does not necessarily mean that each of the wheels 23 and 21 are directed straight ahead and they could, rather, be directed to be toed inward by equal amounts or toed outward by equal amounts. The linkage shown in FIG. 5 is dimensioned and oriented to cause the motions of cranks 73 and 74 to be opposite and increasingly unequal as they depart from the center position thereby providing the desired Ackerman angle relation or approximation thereto. Different functional relationships between the rotation of shaft 70 and of shaft 69 can be obtained by appropriate selection of relative dimensions of the links 77 and 78 and of the angular relationships of cranks 73 and 74 all relative to the spacing and relationships of the axis of shafts 69, 70, and shaft 83.

The angles and lengths of the links for obtaining the Ackerman angle relationship may vary depending on the wheelbase and track width of the vehicle. Determination of Ackerman angle relationship for a given wheelbase and track width is a known routine that is well documented. An example of suitable dimensions and angles for FIG. 5 is shown in Table I. The basic geometry of the links shown in FIG. 5 may remain the same for providing any desired Ackerman angle relationship or other desired steering relationship.

TABLE I

EXEMPLARY CONFIGURATION OF BELL CRANK
LINKAGE OF FIGURE 5
FOR VEHICLE WHEELBASE 76 INCHES,
TRACK WIDTH 47 INCHES

| LINKAGE ELEMENT | LENGTH |
| --- | --- |
| 73, 74 | 3.2" |
| 77, 78 | 6.8" |
| 81 | 6" |
| ANGLE A | 90° |

It is important to emphasize that the accurate determination of wheel angle relationship as provided by the apparatus of FIG. 5 would be of little avail if deflection of the suspension arms in the course of negotiating rough terrain caused undesired steering motion of the wheel thereby affected. Therefore, the actuating cables must run along the suspension arms such that deflections of the control arms do not change the length of the cable, i.e. the pivot points on each end of the control arm for the mechanical links and the cable must form parallelograms.

It may also be noted that a somewhat novel feature of the rough terrain vehicle shown in FIG. 6 is that the steering axis is vertical running through the center of the tire. While this is desirable to provide certain advantages, it is not a necessary feature of the invention and more common non-vertical steering axis structures may be employed with the invention. As in all steering systems, it is very desirable for the steering axis extension to intersect the tire/ground track on the center line of the tire.

Figure 7:
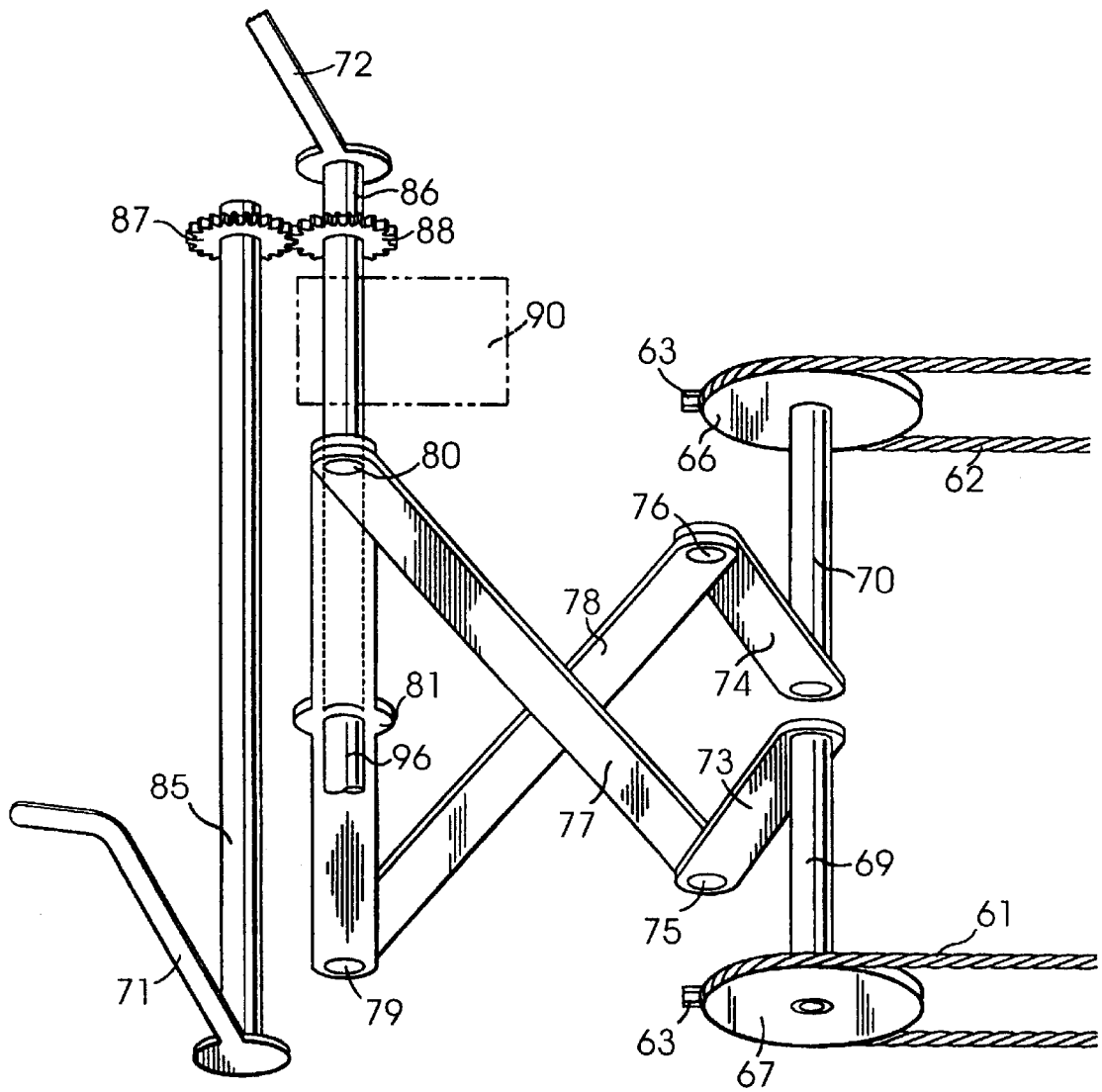
FIG. 7 is a partially schematic perspective view of an alternative mechanical linkage for steering levers and for determining angular relationships of right and left wheel actuators.

FIG. 7 shows an alternative mechanical linkage for determining the coordinated relationship between the steering levers 71 and 72 and the pulleys 66 and 67. While the overall functional operation of the linkage of FIG. 7 is generally equivalent to that shown in FIGS. 1–4 it may have advantages in certain situations. For example, the arrangement of FIG. 7 conveys the combined torque applied to steering levers 71 and 72 through a single shaft 96 to the linkage of cranks and links 73, 74, 77, 78, and 81 that serve to impart the desired steering motion displacements to shafts 69 and 70 and pulleys 66 and 67. As a result, one may provide a power assist in the systems shown in FIG. 7 with essentially the same type of apparatus utilized in automobile power steering. In the system of FIG. 7 the power assist apparatus is located between gear 88 on shaft 86 and the shaft 96 which supplies the torque for the steering control linkage as discussed above. Accordingly, the torque applied by the driver through one or both of steering levers 71 and 72 is combined by shaft 85 with associated gear 87 and shaft 86 with associated gear 88; thus by the use of a power assist mechanism 90 such torque may be amplified to increase the torque output from shaft 96, in the same manner as a wheel-steered automobile steering wheel applied torque is amplified by the power steering to increase the torque at the lower end of the steering shaft operating on the interconnected steerable front wheels of the vehicle.

It will be apparent that the operation of the steering linkage and of pulleys 66 and 67 on cables 62 and 61 is essentially the same as previously described with respect to FIGS. 1–4 and such description will not be repeated here. A minor difference will be noted in that the motion of steering levers 71 and 72 in FIG. 7 is most conveniently arranged to be opposite and equal whereas in FIGS. 1–4 steering levers 71 and 72 are linked to pulleys 67 and 66 and thus their relative motions, while opposite, are not equal but are non-linear in the same respect as are the pulleys 67 and 66.

The primary advantage for the apparatus of FIG. 7 is its ready adaptability to inclusion of power assist or power steering apparatus. Whereas the apparatus of the preferred embodiment of FIGS. 1–4 could be modified to include power steering or power assist apparatus, it would be more complicated than the procedure for the system of FIG. 7 which permits the simple inclusion of conventional power steering apparatus commonly used in passenger vehicles.

It should be noted that the principles of the present invention could also be applied to a wide range of vehicles including those with six or more wheels (including half-track vehicles), those with steerable wheels at the rear in addition to those at the front, and to vehicles with various kinds of suspension systems different from those shown and described as the preferred embodiment. It should further be noted that numerous modifications could be made in the cable torque transmission arrangement described and illustrated. For example, added safety could be achieved by having double cable and double pulley arrangements for both the left and right side thereby providing redundancy and safety in the event of breakage or malfunction of one of the cables. Also the use of cable for transmission of motion and torque is selected for the preferred embodiment in part because of its long use in marine craft and air craft, but any similar or equivalent technique could be used which satisfies the desideratum that very little additional unsprung weight is added at the position of the wheels on the suspension arms.

Whereas the present invention has been described in relation to the drawings attached hereto, it should be understood that other and further modifications, apart from those shown or suggested herein, may be made within the spirit and scope of this invention, and, accordingly, the scope of the invention is not to be deemed limited to those embodiments described and illustrated, but is, rather, to be determined by reference to the appended claims.

What is claimed is:

1. In a land vehicle having a driver's position and at least four wheels, at least the front wheels thereof being steerable wheels, the improvement comprising:

a manual steering control located to be accessible from said driver's position;

a steering motion controller responsive to said steering control to produce at least two independent steering motion displacements which are simultaneous but are non-linearly related;

means for transmitting each said steering motion displacement and means for receiving each said steering motion displacement at a respective one of said steerable wheels and for causing angular rotational motion of each of said wheels about a substantially vertical axis;

said means for transmitting each said steering motion displacement comprising first cable pulleys coupled to said steering motion controller, and respective cable lengths connected to said first cable pulleys;

each said means for receiving said steering motion displacements comprising second cable pulleys connected to a respective one of said wheels to provide steering motion thereof, said second cable pulleys having said cable lengths coupled thereto; and said manual steering control comprising a first steering lever located at the left side of driver's position accessible to the left hand of a driver and connected to one of said first cable pulleys and a second steering lever located at the right side of said driver's position accessible to the right hand of a driver and connected to one of said first cable pulleys;

whereby movement of said steering control by a driver causes immediate steering motions of each of said steerable wheels which motions are coordinated but related to a non-linear Ackerman steering angle function.

2. Apparatus as recited in claim 1 wherein said front wheels of said land vehicle are each mounted on said land vehicle with an independent suspension having at least two parallel arms pivotally mounted on said vehicles with separate but generally parallel pivot axes, and idler pulleys are secured along a desired path for said cable lengths, which desired path extends at least partially along a line parallel to said parallel arms.

3. In a land vehicle having a driver's position and at least four wheels, at least the front wheels thereof being steerable wheels, the improvement comprising:

a manual steering control located to be accessible from said driver's position;

a steering motion controller responsive to said steering control to produce at least two independent steering motion displacements which are simultaneous but are non-linearly related;

means for transmitting each said steering motion displacement and means for receiving each said steering motion displacement at a respective one of said steerable wheels and for causing angular rotational motion of each of said wheels about a substantially vertical axis;

said means for transmitting each said steering motion displacement comprising first cable pulleys coupled to said steering motion controller, and respective cable lengths connected to said first cable pulleys;

each said means for receiving said steering motion displacements comprising second cable pulleys connected to a respective one of said wheels to provide steering motion thereof, said second cable pulleys having said cable lengths coupled thereto;

said front wheels of said land vehicle being each mounted on said land vehicle with an independent suspension having at least two parallel arms pivotally mounted on said vehicles with separate but generally parallel pivot axes, and idler pulleys being secured along a desired path for said cable lengths, which desired path extends at least partially along a line parallel to said parallel arms;

whereby movement of said steering control by a driver causes immediate steering motions of each of said steerable wheels which motions are coordinated but related to a non-linear Ackerman steering angle function.

4. In a land vehicle having a driver's position and at least four wheels, at least the front wheels thereof being steerable and independently suspended, the improvement comprising:
- a left steering lever and a right steering lever, each steering lever being located to be accessible from said driver's position;
- means for coupling said steering levers to cause the motions thereof to be in opposite directions;
- a steering motion controller responsive to at least one of said steering levers to produce at least two independent steering motion displacements;
- means for transmitting said motion displacements and means for receiving said motion displacements at respective ones of said steerable wheels and for causing angular rotational motion of said wheels about a generally vertical axis, the angular position of each of said wheels being substantially unaffected by vertical displacements of the independent suspension therefor;
- said means for transmitting each said steering motion displacement comprising first pulleys coupled to said steering motion controller, and respective cable lengths connected to said first cable pulleys;
- each said means for receiving said steering motion displacements comprising second pulleys connected to respective ones of said wheels to provide steering motion thereof, said second pulleys having said cable lengths coupled thereto;

whereby movement by a driver of either of said steering levers or both of said steering levers in opposite directions causes immediate steering motions of each of said steerable wheels which motions are coordinated to be in the same direction, and precise steering control is maintained despite wide swings of the vehicle's wheel suspensions.

5. Apparatus as recited in claim 4 wherein said left steering lever is accessible to only the left hand of a driver and said right steering lever is accessible to only the right hand of a driver.

6. Apparatus as recited in claim 4 wherein said left steering lever is accessible to the left hand of a driver and said right steering lever is accessible to the right hand of a driver, there being no steering mechanism located within the forward projection of said driver's position.

7. Apparatus as recited in claim 4 wherein said front wheels of said land vehicle are each mounted on said land vehicle with an independent suspension having at least two parallel arms pivotally mounted on said vehicle with separate but generally parallel pivot axes, and idler pulleys are secured along a desired path for said cable lengths, which desired path extends at least partially along a line parallel to said parallel arms.

8. Apparatus as recited in claim 6 wherein said front wheels of said land vehicle are each mounted on said land vehicle with an independent suspension having at least two parallel arms pivotally mounted on said vehicle with separate but generally parallel pivot axes, and idler pulleys are secured along a desired path for said cable lengths, which desired path extends at least partially along a line parallel to said parallel arms.

9. A land vehicle comprising:
- a frame provided with at least four wheels, at least the front wheels thereof being steerable;
- a driver's position within said frame;
- said front wheels of said land vehicle each being mounted on said land vehicle with an independent suspension having at least two parallel arms pivotally mounted on said vehicle with separate but generally parallel axes;
- a left steering lever and a right steering lever, each steering lever being located to be accessible from said driver's position;
- means for coupling said steering levers to cause the motions thereof to be in opposite directions;
- a steering motion controller responsive to at least one of said steering levers to produce at least two independent steering motion displacements which are simultaneous but are non-linearly related;
- means for transmitting said motion displacements including first cable pulleys coupled to said steering motion controller and cable lengths connected to said first cable pulleys;
- means for receiving said motion displacements at respective ones of said steerable wheels including second cable pulleys connected to a respective one of said wheels, said second cable pulleys having said cable lengths connected thereto for causing angular rotational motion of said wheels about a substantially vertical axis; and
- idler pulleys secured along a desired path for said cable lengths, which desired path extends at least partially along a line parallel to said parallel arms, the angular position of each of said wheels being substantially unaffected by displacements of the independent suspension therefor;

whereby movement by a driver of either or both of said steering levers in opposite directions causes immediate steering motions of each of said steerable wheels which motions are coordinated but related to a non-linear Ackerman steering angle function, and precise steering control is maintained despite wide swings of the vehicle's wheel suspensions.

10. Apparatus as recited in claim 9 wherein said left steering lever is accessible to the left hand of a driver and said right steering lever is accessible to the right hand of a driver, here being no steering mechanism located in front of said driver's position.

* * * * *